US012158026B2

(12) United States Patent
McNeill

(10) Patent No.: US 12,158,026 B2
(45) Date of Patent: Dec. 3, 2024

(54) SECURITY CONTAINER DEVICE

(71) Applicant: K-Armor LLC, Issaquah, WA (US)

(72) Inventor: Kevin McNeill, Issaquah, WA (US)

(73) Assignee: K-Armor LLC, Issaquah, WA (US)

( * ) Notice: Subject to any disclaimer, the term of this patent is extended or adjusted under 35 U.S.C. 154(b) by 238 days.

(21) Appl. No.: 17/837,369

(22) Filed: Jun. 10, 2022

(65) Prior Publication Data

US 2022/0396975 A1 Dec. 15, 2022

Related U.S. Application Data

(60) Provisional application No. 63/209,894, filed on Jun. 11, 2021.

(51) Int. Cl.
*E05B 67/38* (2006.01)
*E05B 19/00* (2006.01)

(52) U.S. Cl.
CPC .......... *E05B 67/38* (2013.01); *E05B 19/0005* (2013.01)

(58) Field of Classification Search
CPC .......... E05B 67/00; E05B 67/38; E05B 67/02; E05B 67/04; E05B 19/00; E05B 19/0005; E05B 35/00; E05B 35/086
USPC .......................................................... 70/327
See application file for complete search history.

(56) References Cited

U.S. PATENT DOCUMENTS 5,280,518 A * 1/1994 Danler ............... G07C 9/00817 340/5.23
5,284,036 A * 2/1994 Rosenbaum .......... E05C 19/186 70/56
6,578,393 B2 * 6/2003 Yarborought ........... E05B 67/38 70/52
2002/0124603 A1 * 9/2002 Yarborough ............ E05B 67/38 70/56
2005/0199020 A1 * 9/2005 James ..................... E05B 67/38 70/56

* cited by examiner

*Primary Examiner* — Nathan Cumar
(74) *Attorney, Agent, or Firm* — Seed IP Law Group LLP

(57) ABSTRACT

A security container device includes a body with a first end and a second end opposite the first end. The body is hollow and includes a cavity extending through the body from the first end to the second end. The security container device further includes openings at the first and second end that are connected with the cavity. A plate is coupled to the body at the first end and extends across at least a portion of the first opening. A rod is coupled to the body and positioned inside the cavity and internal to the body. The security container device is structured to be coupled to an exterior support and the cavity and the rod are structured to receive a lock box with the body of the container extending around a majority of the lock box to protect the body of the lock box and the shackle of the lock box from tampering.

18 Claims, 8 Drawing Sheets

SECURITY CONTAINER DEVICE

TECHNICAL FIELD

The present disclosure relates to a security container device, and more particularly, to a security container device for use in protecting a lock box.

BACKGROUND

Description of the Related Art

Lock boxes are known. One common type of lock box includes an arm for securing the lock box to a handle of a door and a tray for housing a key with the tray being removable upon entry of a code. These types of lock boxes are commonly used in the real estate and property management industries, among others. However, known lock boxes have security deficiencies. For example, the arm can be cut by bolt cutters to remove the lock box from the door handle. In addition, a sharp blow to the side of the lock box can dislodge the tray from the lock box and provide access to the key to a potential intruder. Other types of known lock boxes may be installed in an inconspicuous location on a property, thereby making them difficult to locate for third party use.

As a result, it would be advantageous to have a lock box that overcomes the deficiencies of known lock boxes.

BRIEF SUMMARY

Embodiments of the present disclosure broadly include a security container structured to receive and protect a lock box. The security container is made of a durable material, such as metal, that is designed to mitigate or eliminate the security deficiencies of known lock boxes. For example, the security container may have a body that substantially surrounds the lock box and restricts access to the shackle of the lock box. Further, the security container may be painted in a bright color to assist with locating the security container and thus the lock box regardless of placement on a property.

One or more embodiments of a security container according to the present disclosure may be summarized as including: a body having a first end and a second end opposite the first end; a cavity extending through the body from the first end to the second end; a first opening at the first end of the body that is connected with the cavity; a second opening at the second end of the body that is connected with the cavity; a plate coupled to the body at the first end, the plate extending across at least a portion of the first opening; and a rod coupled to the body and positioned inside the cavity, wherein the cavity and rod are structured to receive a lock box with the body extending around a majority of the lock box.

The security container may further include the body, the plate, and the rod being formed of metal; the plate extending across at least half of the first opening to restrict access to a shackle of the lock box; the body further including a front surface and at least one hole in the front surface of the body; the at least one hole including at least a first hole with a first diameter and a second hole with a second diameter; the first hole and the second hole being spaced from, and on opposite sides of, a vertical axis through a center of the front surface of the body; the first diameter being greater than, or equal to, the second diameter; the at least one hole being aligned with a vertical axis through a center of the front surface of the body; and the body further including a first portion and a second portion, the second portion recessed relative to the first portion.

The security container may further include: the body having a front surface and a rear surface, the first portion having a first width from the front surface to the rear surface and the second portion having a second width from the front surface to the rear surface that is less than the first width; the first width being one inch greater than the second width; and the body having a first height and the first portion being an upper portion having a second height that is equal to approximately half of the first height.

One or more embodiments of a security container according to the present disclosure may be summarized as including: a hollow body having an open first end and an open second end; a plate coupled to the hollow body at the open first end, the plate extending across at least a portion of the open first end; and a rod coupled to the hollow body and positioned inside the hollow body, the hollow body structured to receive a lock box with the hollow body extending around a majority of the lock box, and a shackle of the lock box being securable to the rod with the plate structured to restrict access to the shackle through the open first end.

The security container may further include: the shackle of the lock box covered by the hollow body when the shackle is secured to the rod in the hollow body; the plate extending across less than an entirety of the open first end; the body, the plate, and the rod being metal; the hollow body including a front surface with a plurality of holes including a first hole and a second hole with different diameters; and the first hole and the second hole are arranged on opposite sides of a vertical centerline through the front surface of the hollow body.

BRIEF DESCRIPTION OF THE SEVERAL VIEWS OF THE DRAWINGS

In the drawings, identical reference numbers identify similar elements or acts. In some drawings, the sizes and relative positions of elements are exactly to scale and convey information regarding the actual shape of the particular elements. In some drawings, the sizes and relative positions of elements are not necessarily drawn to scale. For example, some of these elements may be arbitrarily enlarged and positioned to improve drawing legibility. Further, the particular shapes of the elements as drawn are not necessarily intended to convey any information regarding the actual shape of the particular elements and may have been selected solely for ease of recognition in some drawings.

DETAILED DESCRIPTION

Figure 1:
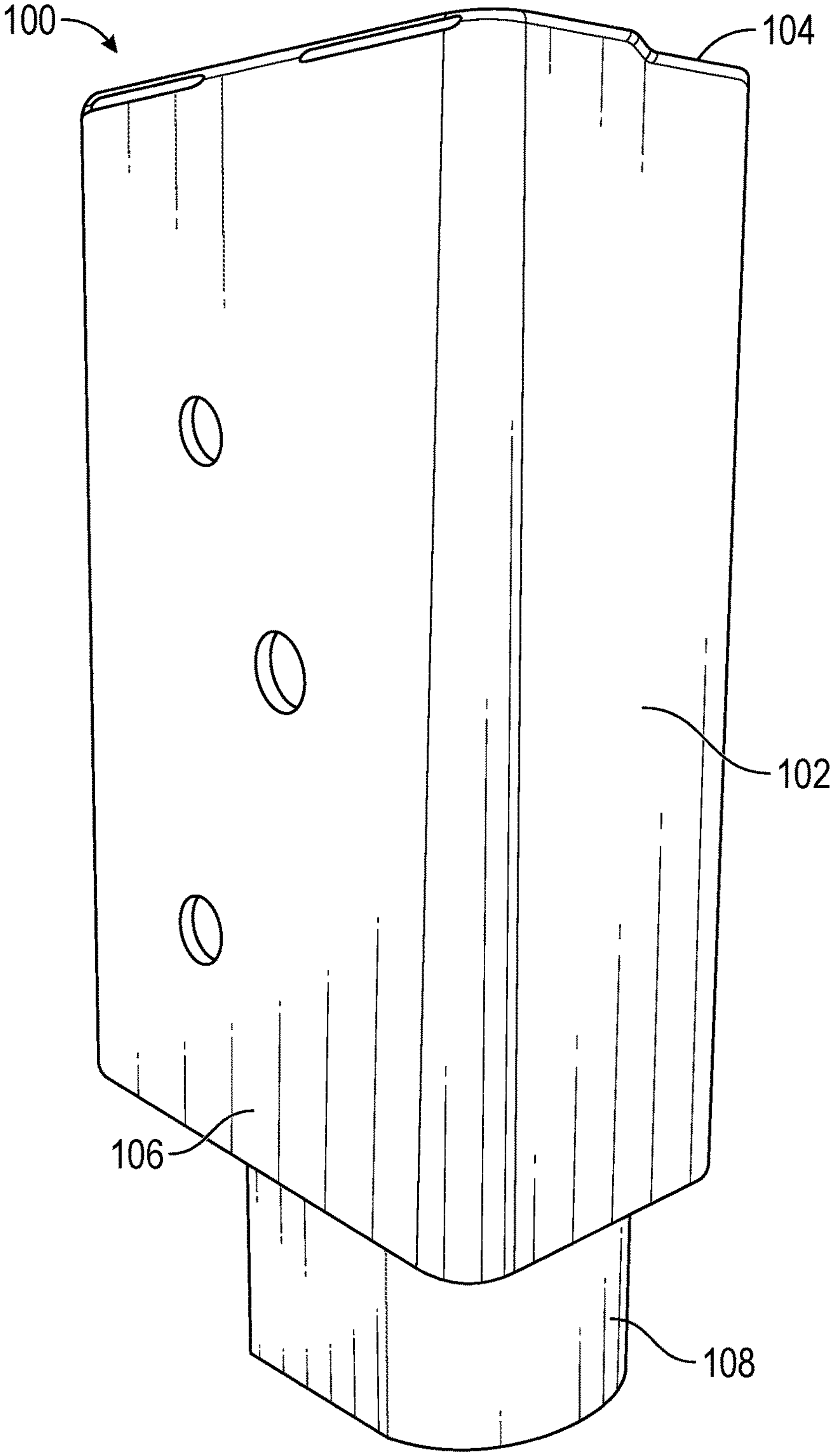
FIG. 1 is a front isometric view of an embodiment of a security container for protecting a lock box according to the present disclosure.

Persons of ordinary skill in the relevant art will understand that the present disclosure is illustrative only and not in any way limiting. Other embodiments of the presently disclosed technology readily suggest themselves to such skilled persons having the assistance of this disclosure.

Each of the features and teachings disclosed herein can be utilized separately or in conjunction with other features and teachings to provide security container devices, systems, and methods. Representative examples utilizing many of these additional features and teachings, both separately and in combination, are described in further detail with reference to attached FIGS. 1-8. This detailed description is merely intended to teach a person of skill in the art further details for practicing aspects of the present technology and is not intended to limit the scope of the claims. Therefore, combinations of features disclosed in the detailed description may not be necessary to practice the teachings in the broadest sense, and are instead taught merely to describe particularly representative examples of the present teachings.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced, but are not intended to limit the dimensions and the shapes shown in the examples in some embodiments. In some embodiments, the dimensions and the shapes of the components shown in the figures are exactly to scale and intended to limit the dimensions and the shapes of the components.

The present disclosure is generally directed to a security container for protecting a lock box. The security container extends around a majority of the lock box and protects a shackle of the lock box. The container is made from a durable material, such as metal, to prevent lock box theft and unauthorized access, among other benefits. The concepts of the disclosure can be utilized with a number of different types and form factors of lock boxes, including lock boxes with bottom or front mounted access points, as described further below. As used herein, the term "lock box" should be construed broadly to refer to any device with an internal cavity for receiving and securing an item to prevent unauthorized access to the item and expressly includes, but is not limited to, devices with a shackle or arm whereby the item inside the device is accessible by a code or key, whether inputted manually or transmitted electronically.

FIGS. 1-5 are drawings of various views of one or more embodiments of a security container 100. The container 100 can be coupled to a variety of different structures or support surfaces, including but not limited to a fence post, door, exterior siding, a retaining or structural wall, a support post, and a stoop or porch. The container 100 can be coupled to such support surfaces with any known fastener or coupling device or material.

Beginning with FIG. 1, the container 100 includes a body 102 with a first end 104 and a second end 106 opposite the first end 104. In some embodiments, the first end 104 is a top end and the second end 106 is a bottom end, although the same is not necessarily required. The body 102 has a rectangular shape with a height that is greater than a width or thickness of the body 102 in one or more embodiments, although the body 102 can also have any other regular or irregular shape such as a square, circular, ovular, trapezoidal, hexagonal, or octagonal shape in some non-limiting examples.

As explained further below, the container 100 is structured to receive and protect a lock box 108. The body 102 may be metal, such as steel or aluminum, in some embodiments, and may have material properties that resist traditional techniques to damage or improperly access the lock box 108, such as cutting the lock box 108 or striking the lock box 108 with a sharp blow. As shown in FIG. 1, the body 102 of the container 100 extends around at least a majority of the lock box 108 to protect portions of the lock box 108 with security deficiencies. Put differently, the body 102 of the container 100 protects a majority of the lock box 108 while a portion of the lock box 108 extends from the body 102 to allow for regular use or functionality of the lock box 108.

In particular, the lock box 108 of FIG. 1 may be a "bottom" type lock box, meaning that a tray storing an item inside the lock box 108 is accessible at a bottom of the lock box 108. As a result, at least a bottom portion of the lock box 108 preferably extends beyond the second end 106 of the body 102 in order to allow a user to access the lock box 108. However, the body 102 of the container 100 extends around a majority of the lock box 108, including around sides and a top of the lock box 108 (such as around a shackle or arm of the lock box 108 at the top) to resist traditional techniques to damage or improperly open the lock box 108.

Figure 2:
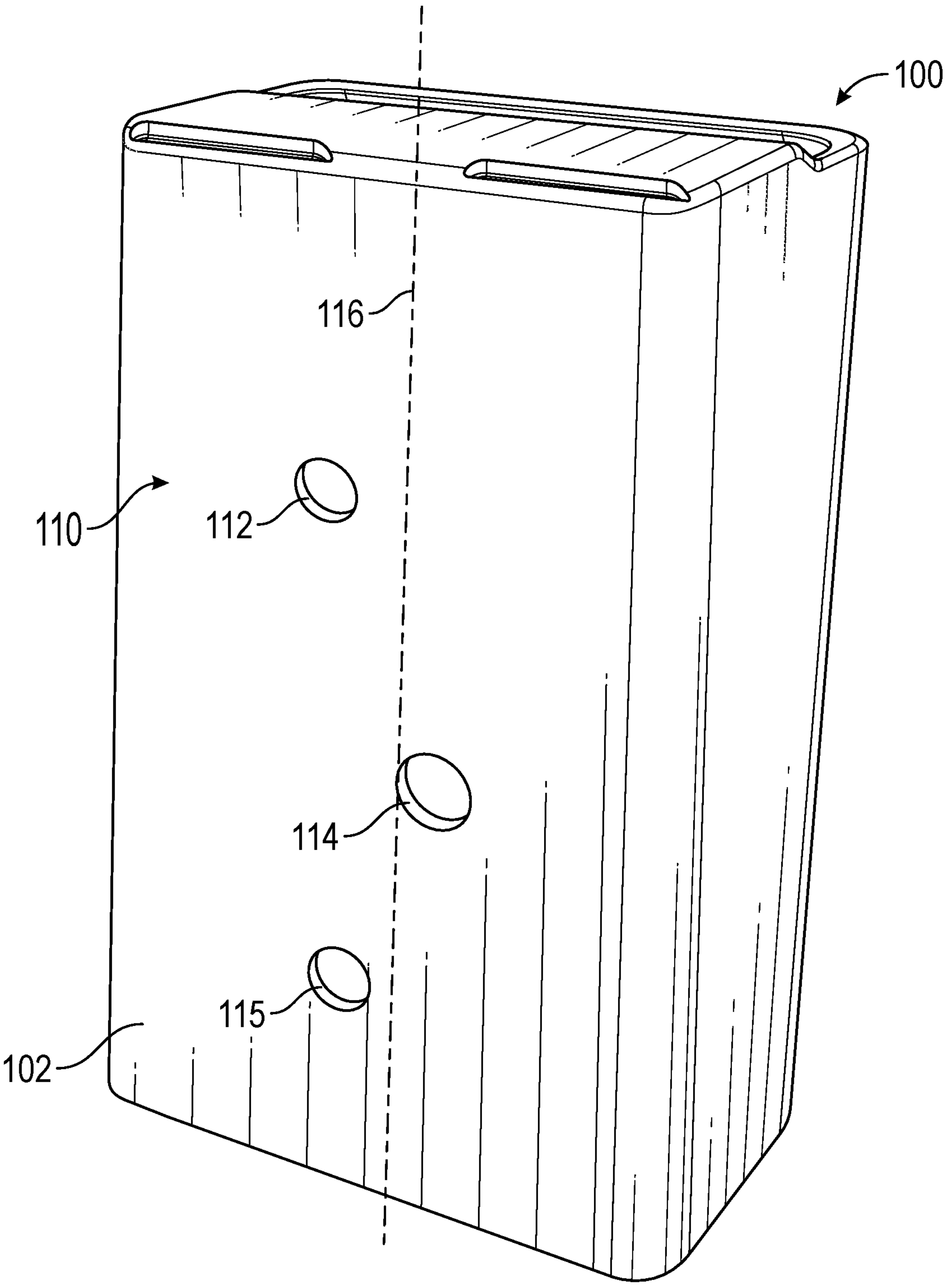
FIG. 2 is a front isometric view of the security container of FIG. 1 without the lock box.

FIG. 2 is a drawing of the security container 100 without the lock box 108. The body 102 of the container 100 further includes a front surface 110 and a first hole 112, a second hole 114, and a third hole 115 in the front surface 110 of the body 102. The first hole 112 and the third hole 115 have a first diameter and the second hole 114 has a second diameter with the first diameter being greater than, equal to, or less than the second diameter in some embodiments. The holes 112, 114, 115 may align with similar holes in a rear surface opposite the front surface 110 to facilitate coupling the container 100 to a support surface. For example, a screwdriver with a fastener can be inserted through holes 112, 114, 115 in the front surface 110 and the corresponding holes in the rear surface to mount the container 100 to the support surface. In operation, the lock box 108 prevents access to the holes in the rear surface and the fasteners such that the container 100 cannot be improperly removed from the support surface.

Additionally or alternatively, the holes 112, 114, 115 are designed to align with features of the lock box 108 to facilitate operation of the lock box 108. For example, the holes 112, 114, 115 may align with sensors, keyholes, number pads, or switches of the lock box 108 to allow a user to manipulate the lock box 108. Thus, the size and position of the holes 112, 114, 115 in the front surface 110 can be selected according to design factors. In the illustrated embodiment, the holes 112, 114, 115 are spaced from, and on opposite sides of, a vertical axis 116 through a center of the front surface 110 of the body 102. The vertical axis 116 may therefore also be referred to as a vertical centerline through the front surface 110. In particular, each of the holes 112, 114, 115 may have a different horizontal (i.e., left to right in the orientation of FIG. 2) and vertical (i.e., top to bottom in the orientation of FIG. 2) orientation relative to the axis 116 with the first and third holes 112, 115 arranged on one side of the axis 116 and the second hole 114 arranged on an opposite side of the axis 116. This arrangement may facilitate a stronger coupling of the container 100 to the support surface, or may be the result of spacing of various features on the lock box 108. Further, the container 100 may be painted or have a color that facilitates locating the container 100 on a property. Although not shown in FIG. 2, the container 100 may be bright orange, yellow, green, blue, or some other like color to facilitate locating the container 100 when it is placed in an inconspicuous location on a property.

Figure 3:
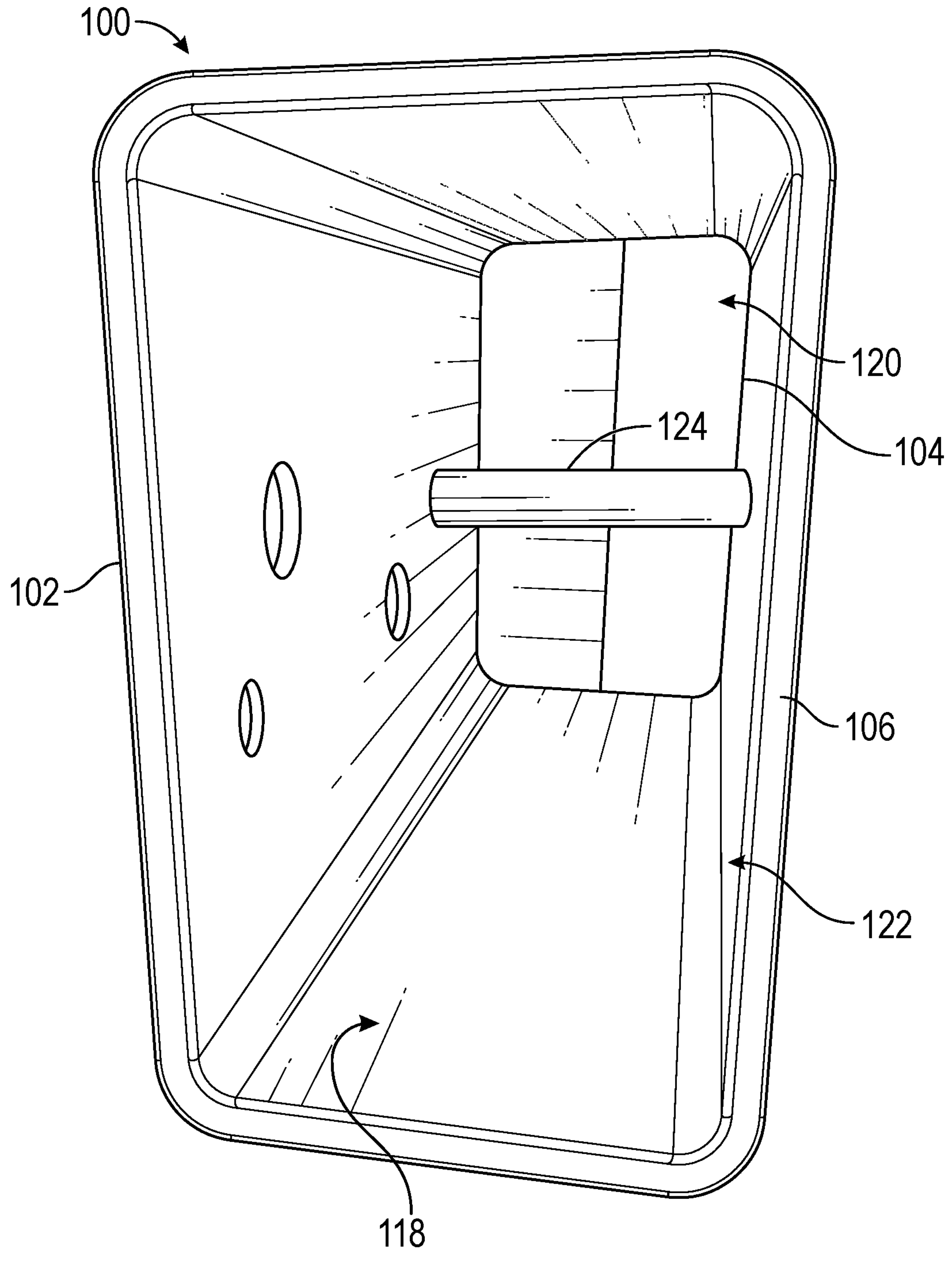
FIG. 3 is a bottom plan view of the security container of FIG. 2.

FIG. 3 is a drawing of a bottom of the container 100 without the lock box 108 to provide more detail regarding the second end 106 of the body 102 as well as the internal features of the container 100. As shown in FIG. 3, the body 102 of the container 100 is hollow, or in other words, includes a cavity 118 through the body 102 from the first end 104 to the second end 106. In other words, the body 102 may be hollow with open first and second ends 104, 106. The container 100 further includes a first opening 120 at the first end 104 of the body 102 and a second opening 122 at the second end 106 of the body 102. The first and second openings 120, 122 are connected with the cavity 118 such that there is an axial bore through the entire body 102 from the first end 104 to the second end 106. A rod 124 is coupled to the body 102, and more specifically, to internal surfaces of the body 102 that define the cavity 118. The rod 124 extends across the cavity 118 and may be metal. The rod 124 is positioned inside the cavity 118 to protect the rod 124 from tampering. With reference to FIG. 3 and continuing reference to FIG. 1, the cavity 118 and the rod 124 are structured to receive the lock box 108. In particular, the container 100 is designed for a door handle lock box typically used in the real estate industry that includes a shackle or arm that engages around the rod 124 to secure the lock box 108 to the container 100. The container 100 protects the shackle or arm from bolt cutters as well as from sharp blows that can remove the key box or the shackle. Further, the key box portion of the lock box 108 extends from the container 100 (see FIG. 1) such that the end user can access or replace the keys of the lock box 108 without sacrificing protection for the lock box 108. In an embodiment, the rod 124 is positioned closer to the first end 104 than the second end 106 such that a majority of the lock box 108 is within, and surrounded by, the container 100 when a shackle or arm of the lock box 108 is coupled to the rod 124.

Figure 4:
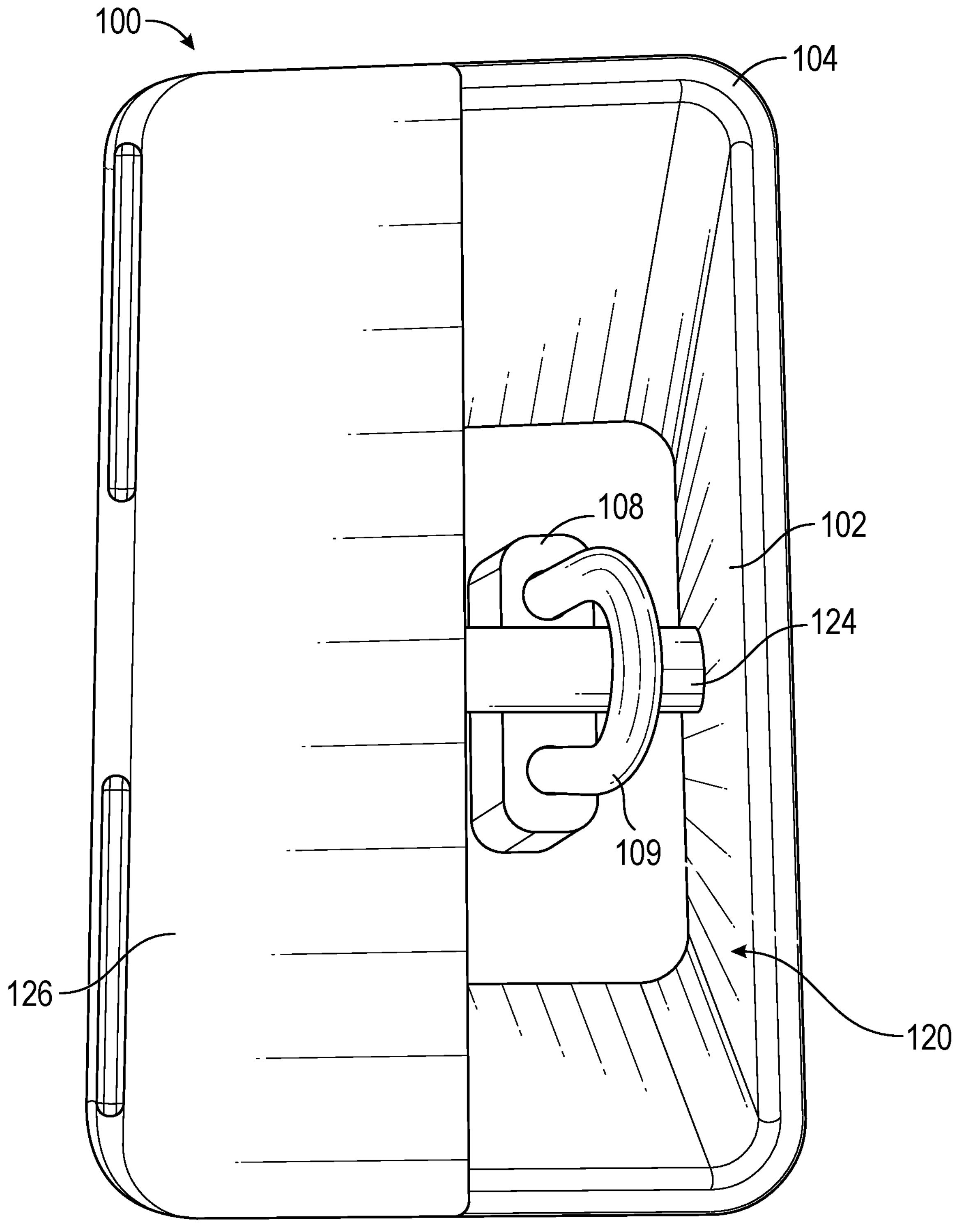
FIG. 4 is a top plan view of the security container of FIG. 1.

FIG. 4 is a drawing of a top of the security container 100 with a schematic representation of the lock box 108 that illustrates a plate 126 coupled to the body 102 at the first end 104 of the body 102. The plate 126 extends across at least a portion of the first opening 120, or all of the first opening 120, in some embodiments. In the embodiment shown in FIG. 4, the plate 126 extends across at least half of the first opening 120 while the remaining portion of the first opening 126 is unrestricted to protect against the use of bolt cutters or other devices to damage the lock box 108, and in particular, to prevent access to a shackle or arm 109 of the lock box 108 secured to the rod 124. The plate 126 may be a similar material and have similar properties as the material of the body 102. Further, although the plate 126 is illustrated in FIG. 4 as having a rectangular shape, the plate 126 can be selected to have any shape according to design factors. In some embodiments, the second or bottom end 106 of the container 100 does not include a similar plate in order to facilitate normal operation of the key box of the lock box 108, as shown in FIG. 1.

Figure 5:
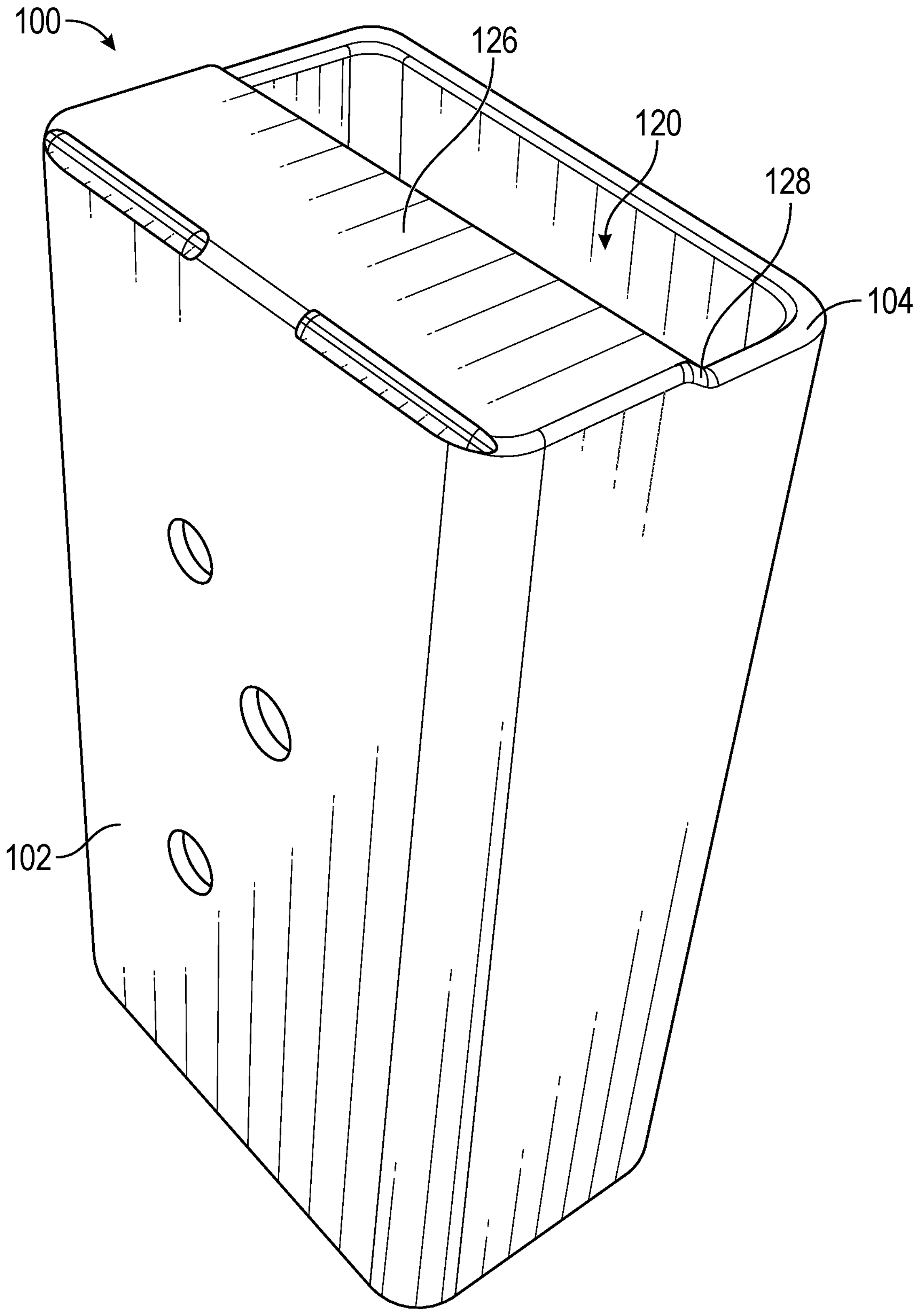
FIG. 5 is a top isometric view of the security container of FIG. 2.

FIG. 5 is a drawing of an isometric view of the container 100 without the lock box 108, and showing the plate 126 and the first opening 120 in more detail. The plate 126 may be welded or otherwise fastened to the body 102 as in FIG. 5, or may be formed as a single, integral, unitary piece of the body 102. Further, the body 102 may include a plurality of plates welded, coupled, or fastened together or may include a single continuous piece of metal formed, rolled, or pressed in the shape of the body 102. In an embodiment, the body 102 includes an interface 128 between the plate 126 and the first end 104 of the body 102 that has a step-down configuration. In some embodiments, the interface 128 is a smooth and continuous sloped or curved transition such that the first end 104 of the body 102 is recessed with respect to the plate 126, or the plate 126 is disposed on top of the first end 104.

Figure 6B:
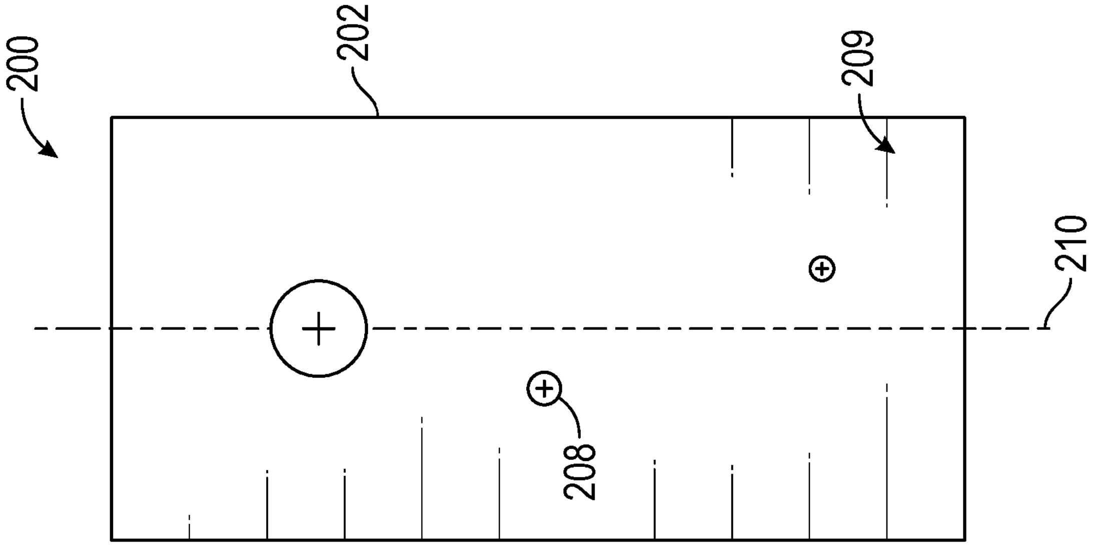
FIGS. 6A and 6B are schematic illustrations of an embodiment of a security container according to the present disclosure.
Figure 6A:
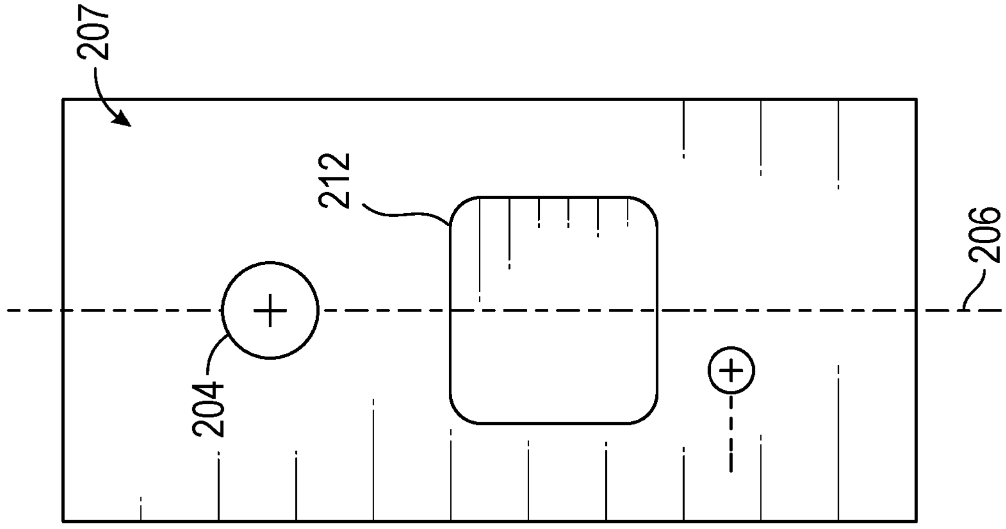

FIGS. 6A and 6B are schematic views of one or more embodiments of a security container 200 according to the present disclosure. In particular, FIGS. 6A and 6B illustrate schematic front and back or rear elevation views, respectively, of the container 200. The container 200 may be similar to container 100 except as otherwise described below. The container 200 includes a body 202 with at least one hole 204 aligned with a vertical axis 206 through a center of a front surface 207 of the body 202. The container 200 may include additional holes 208 that are spaced from and offset from a vertical axis 210 through a center of a rear surface 209 of the body 202, which may facilitate coupling of the body 202 to a support surface. Further, the container 210 may include a larger hole 212 in the front surface 207 of the body 202 to provide access to a key or number pad of a lock box. The size and position of the hole 212 can be selected according to characteristics of the lock box.

Figure 7C:
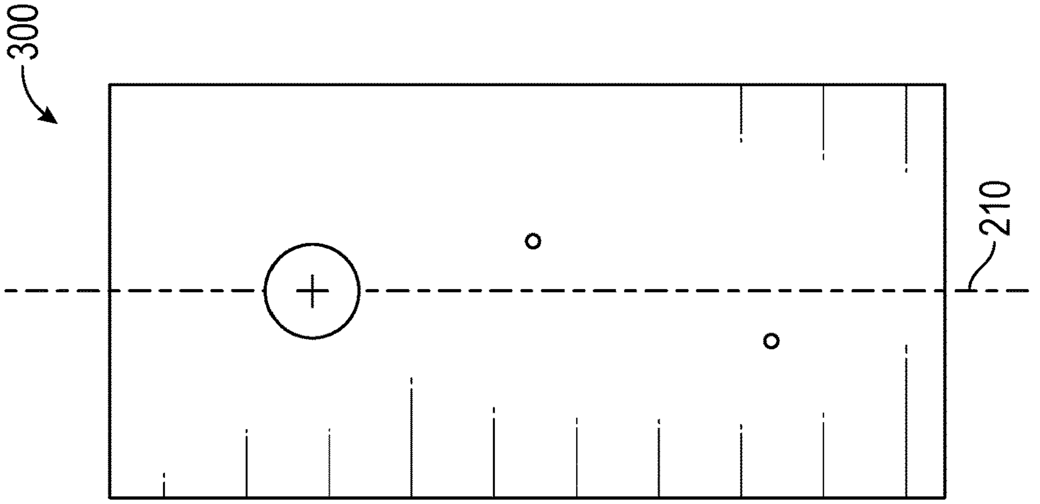
FIGS. 7A, 7B, and 7C are schematic illustrations of another embodiment of a security container according to the present disclosure.
Figure 7B:
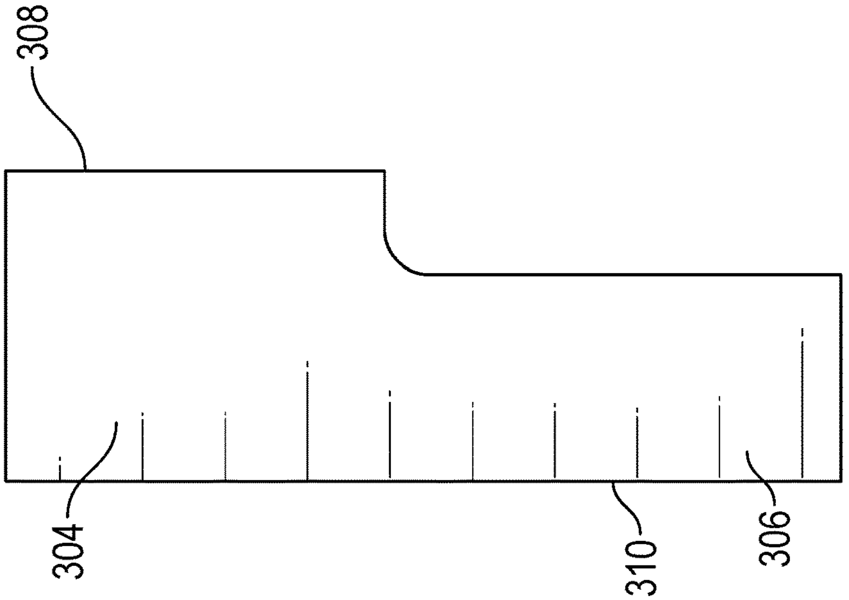
Figure 7A:
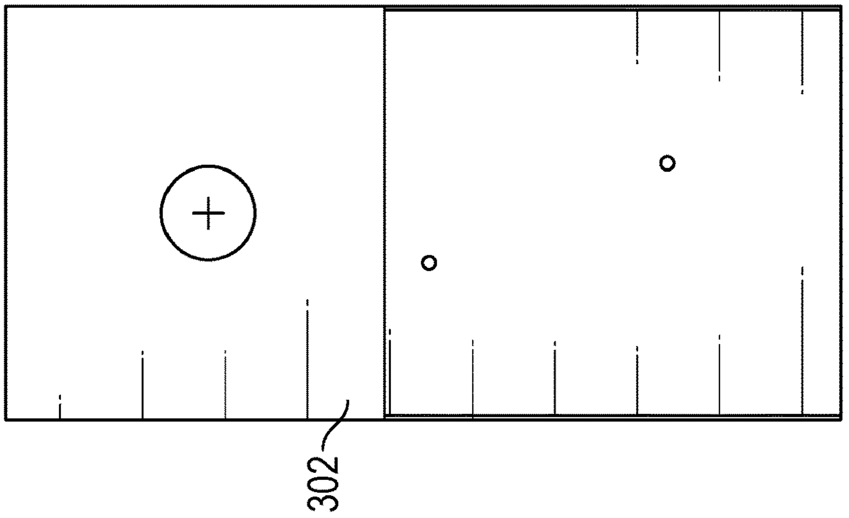

FIGS. 7A, 7B, and 7C are schematic views of one or more embodiments of a security container 300 and includes front, left, and back or rear elevation views, respectively, of the container 300. The container 300 may be similar to containers 100, 200 except as otherwise described herein. The container 300 includes a body 302 with a first portion 304 and second portion 306. In some embodiments, the first portion 304 is an upper portion and the second portion 306 is a lower portion. As best shown in the left elevation view of FIG. 7B, the second portion 306 is recessed relative to the first portion 304 of the body 302. In particular, the second portion 306 may be offset and recessed by one inch relative to the first portion 304. Figure is a perspective view of the embodiment of the security container 300 shown in FIGS. 7A, 7B, and 7C.

Otherwise stated, the body 302 has a front surface 308 and a rear surface 310 opposite the front surface 308 with the first portion 304 having a first width from the front surface 308 to the rear surface 310. The second portion 306 has a second width from the front surface 308 to the rear surface 310 that is less than the first width and in some embodiments, is one inch less than the first width. Further, the body 302 has a first height and the first portion 304 has a second height that is equal to approximately half of the first height, or more or less, as shown in FIG. 7B. The shape and design of the container 300 allows for use of the container 300 with different types or sizes of lock boxes relative to containers 100, 200. As such, the containers described herein can have features that are selected based on the characteristics of a known lock box.

Figure 8:
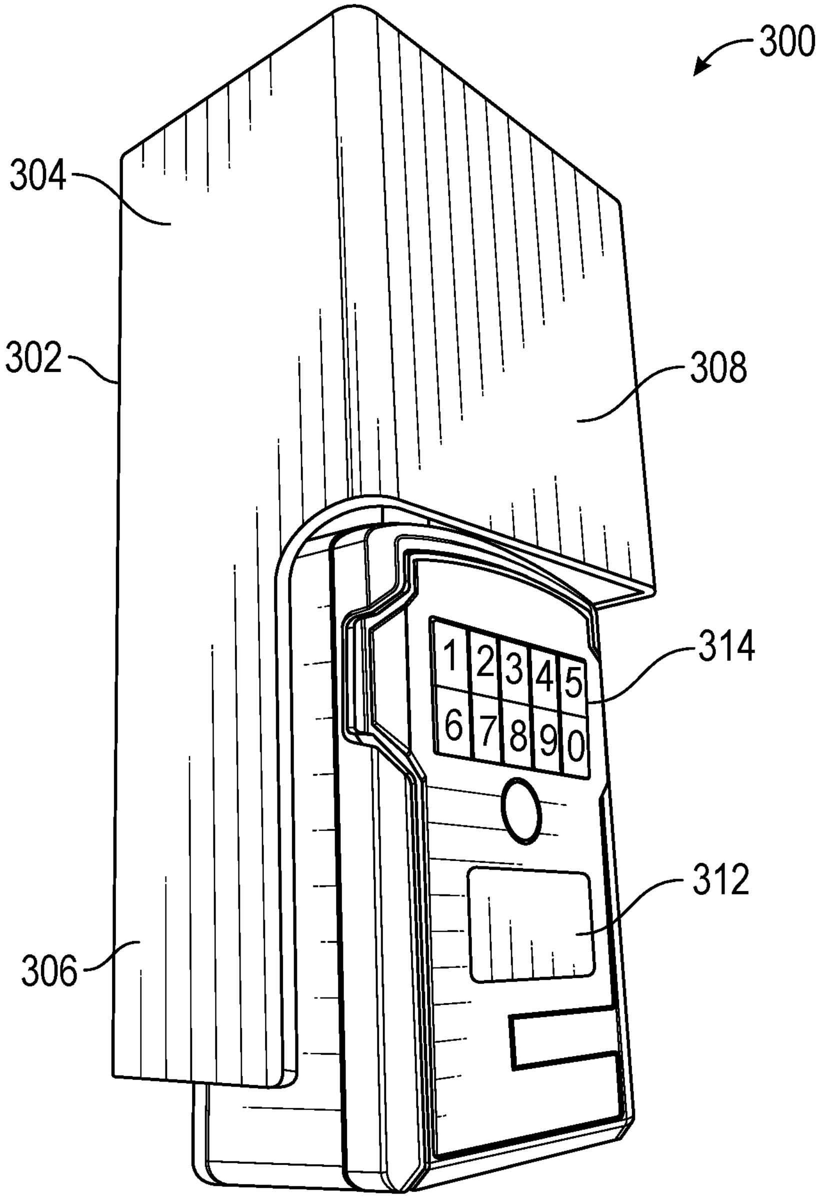
FIG. 8 is a perspective view of the security container of FIG. 7 protecting a lock box.

Turning to FIG. 8, the container 300 may be useful for "front" type lock boxes that have a keypad or other input on a front surface of the lock box, such as lock box 312 shown in FIG. 8. The lock box 312 has a keypad 314 or other access point on its front surface. The container 300 surrounds the lock box 312, with the first portion 304 protecting a shackle or arm of the lock box 312 inside the body 302. The second portion 306 is recessed with respect to the first portion 302 to provide access to the keypad 314 and the lockbox 312 generally. However, the second portion 306 extends around sides and a back or rear of the lock box 312 to prevent damage or sharp blows to the lock box 312 that may compromise the lock box 312. As a result, the container 300 may substantially cover at least three of four surfaces of the lock box 312 with only an access surface of the lock box 312 exposed, while also preventing access to a shackle or an arm of the lock box 312.

In view of the above, the present disclosure provides embodiments of security containers that mitigate issues associated with lock box protection, visibility and ease of access. In sum, the security containers are a metal enclosure constructed from four inch by three inch steel tubing or plating with various configurations based on the make and model of various known lock boxes. The security containers prevent tampering or removal of the lock box and mitigate the costs associated with stolen or damaged lock boxes.

Lock boxes are commonly mounted to a doorknob or to a utility (water/gas) bib on the property. As the hasp is exposed in any of these scenarios a person wishing to gain access to property can simply utilize bolt cutters or a grind off wheel to cut through the hasp, remove the lock box and then gain access to keys. That would of course allow them to access property and cause damage to the unit, remove or damage staging furniture, appliances, etc. In the case of a contractor using a lock box, this may also mean a person entering the job site and removing copper wiring, tools or other items within the unit. With the security containers of the present disclosure, it is extremely difficult to reach the hasp as it is secured within the housing unit. Bolt cutters or a cut off wheel simply will not fit inside where the hasp is secured to the 1" rod it is hanging from. Furthermore, as the security containers are mounted to a solid flat surface (fence post, doorframe, etc.) they are unable to remove the lock box or the security container unit from the property. The only way to remove the lock box and the security container is for an authorized representative to unshackle the hasp using their credentials and remove the two mounting screws securing the security container to the mounting structure.

The security containers of the present disclosure also make finding the lock box to a listed home or construction site easy, convenient and safe. As the security container can be mounted to an obvious location at or near the front entrance realtors, or vendors working on a new construction project, no longer need to "hunt" down the location of the lock box for access to the property. A common practice today is to shackle the lock box to a utility, either the hose bib or gas meter. These are quickly compromised by breaking off the knob or hose bib and removing the lock box. This situation forces homeowners or contractors to repair or replace a hose bib. In the event of the lock box being mounted to the gas meter this can be expensive, and dangerous, as the perpetrators would be interfering with the gas meter in their attempt to remove the lock box. Many utilities across the country have rules or even ordinances around mounting of lock boxes to utilities and will remove them if they come across these placements. Furthermore, when a realtor or construction vendor visits a new property they need to scour the property looking for the lock box. Especially in a high end real estate sale it is unprofessional for a real estate agent to be searching for a lock box that is mounted somewhere on the property. The security containers of the present disclosure provide a secure, professional and attractive alternative to lock box practices today.

In the case of the lock box being mounted to the doorknob this also comes with several concerns. The first being ease of removal from door knob either by using bolt cutters, a cut off grinder or just breaking off the door knob itself to remove. Additionally a lock box cannot be mounted on a lever style door handle forcing a realtor or builder to find an alternative location. Other issues that come with mounting to the door is the scratching of the door finish as the lock box swings back and forth, often times being caught in the door jamb as someone attempts to close the door and damaging the door frame. The security containers of the present disclosure solve or mitigate these issues and reduce the costs associated with replacing stolen lock boxes or damage to a property from unauthorized access.

In the foregoing description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Unless the context requires otherwise, throughout the specification and claims that follow, the word "comprising" is synonymous with "including," and is inclusive or open-ended (i.e., does not exclude additional, un-recited elements or method acts).

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its broadest sense, that is, as meaning "and/or" unless the context clearly dictates otherwise. The headings and Abstract of the Disclosure provided herein are for convenience only and do not limit the scope or meaning of the embodiments.

The use of ordinals such as first, second, third, etc., does not necessarily imply a ranked sense of order, but rather may only distinguish between multiple instances of an act or a similar structure or material. The terms "top," "bottom," "upper," "lower," "left," "right," and other like derivatives are used only for discussion purposes based on the orientation of the components in the drawings, unless the context clearly dictates otherwise. These terms are not limiting with respect to the possible orientations explicitly disclosed, implicitly disclosed, or inherently disclosed in the present disclosure and unless the context clearly dictates otherwise, any of the aspects of the embodiments of the disclosure can be arranged in any orientation.

As used herein, the term "substantially" is construed to include an ordinary error range or manufacturing tolerance due to slight differences and variations in manufacturing.

Unless the context clearly dictates otherwise, relative terms such as "approximately," "substantially," "generally," and other derivatives, when used to describe a value, amount, quantity, or dimension, generally refer to a value, amount, quantity, or dimension that is within plus or minus 5% of the stated value, amount, quantity, or dimension. It is to be further understood that any specific dimensions of components or features provided herein are for illustrative purposes only with reference to the various embodiments described herein, and as such, it is expressly contemplated in the present disclosure to include dimensions that are more or less than the dimensions stated, unless the context clearly dictates otherwise.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A security container device, comprising:

a body having a first end and a second end opposite the first end, wherein the body further includes a first portion and a second portion, the second portion recessed relative to the first portion;

a cavity extending through the body from the first end to the second end;

a first opening at the first end of the body that is connected with the cavity;

a second opening at the second end of the body that is connected with the cavity;

a plate coupled to the body at the first end, the plate extending across at least a portion of the first opening; and a rod coupled to the body and positioned inside the cavity, wherein the cavity and rod are structured to receive a lock box with the body extending around a majority of the lock box.

2. The security container device of claim 1, wherein the body, the plate, and the rod are metal.

3. The security container device of claim 1, wherein the plate extends across at least half of the first opening to restrict access to a shackle of the lock box.

4. The security container device of claim 1, wherein the body further includes a front surface and at least one hole in the front surface of the body.

5. The security container device of claim 4, wherein the at least one hole includes at least a first hole with a first diameter and a second hole with a second diameter.

6. The security container device of claim 5, wherein the first hole and the second hole are spaced from, and on opposite sides of, a vertical axis through a center of the front surface of the body.

7. The security container device of claim 5, wherein the first diameter is greater than, or equal to, the second diameter.

8. The security container device of claim 4, wherein the at least one hole is aligned with a vertical axis through a center of the front surface of the body.

9. The security container device of claim 1, wherein the body has a front surface and a rear surface, the first portion having a first width from the front surface to the rear surface and the second portion having a second width from the front surface to the rear surface that is less than the first width.

10. The security container device of claim 9, wherein the first width is one inch greater than the second width.

11. The security container device of claim 1, wherein the body has a first height and the first portion is an upper portion having a second height that is equal to approximately half of the first height.

12. The security container device of claim 1, wherein a shackle of the lock box is securable to the rod within the body of the security container device.

13. The security container device of claim 1, wherein a shackle of the lock box is covered by the body of the security container device when the shackle of the lock box is secured to the rod in the cavity of the security container device.

14. A security container device, comprising:

a hollow body having an open first end and an open second end;

a plate coupled to the hollow body at the open first end, the plate extending across at least a portion of the open first end, wherein the plate extends across less than an entirety of the open first end; and a rod coupled to the hollow body and positioned inside the hollow body, wherein the hollow body is structured to receive a lock box with the hollow body extending around a majority of the lock box, and wherein a shackle of the lock box is securable to the rod with the plate structured to restrict access to the shackle through the open first end.

15. The security container device of claim 14, wherein the shackle of the lock box is covered by the hollow body when the shackle is secured to the rod in the hollow body.

16. The security container of claim 15, wherein the body, the plate, and the rod are metal.

17. The security container of claim 14, wherein the hollow body includes a front surface with a plurality of holes including a first hole and a second hole with different diameters.

18. The security container of claim 17, wherein the first hole and the second hole are arranged on opposite sides of a vertical centerline through the front surface of the hollow body.

* * * * *